(12) United States Patent
Bolt et al.

(10) Patent No.: US 7,192,033 B2
(45) Date of Patent: Mar. 20, 2007

(54) TRAILING ARM SUSPENSION AND HEIGHT CONTROL SYSTEM WITH MOTORIZED VALVE THEREFOR

(75) Inventors: David Bolt, Grand Haven, MI (US); Randy Schutt, Holland, MI (US); Victor A. Plath, Nunica, MI (US)

(73) Assignee: Haldex Brake Corporation, Kansas City, MO (US)

( * ) Notice: Subject to any disclaimer, the term of this patent is extended or adjusted under 35 U.S.C. 154(b) by 444 days.

(21) Appl. No.: 10/722,874

(22) Filed: Nov. 26, 2003

(65) Prior Publication Data

US 2006/0175775 A1    Aug. 10, 2006

Related U.S. Application Data

(63) Continuation of application No. PCT/US02/16510, filed on May 23, 2002.

(60) Provisional application No. 60/293,616, filed on May 25, 2001.

(51) Int. Cl.
    *B60G 17/015* (2006.01)
(52) U.S. Cl. ................ 280/5.514; 280/124.157; 280/6.159
(58) Field of Classification Search ........... 280/5.514, 280/124.157, 124.16, 124.161, 6.157, 6.159; 251/129.04, 129.11
    See application file for complete search history.

(56) References Cited

U.S. PATENT DOCUMENTS

| 1,555,199 A | 9/1925 | Gouirand |
| 2,544,448 A * | 3/1951 | Downey ................. 310/83 |
| 2,790,650 A | 4/1957 | Boschi |
| 2,905,430 A * | 9/1959 | Deist ..................... 251/54 |
| 2,910,305 A | 10/1959 | Marette et al. |
| 2,948,549 A | 8/1960 | Schultz |
| 2,964,311 A | 12/1960 | Stelzer |
| 3,083,059 A | 3/1963 | Biszantz |
| 3,104,114 A | 9/1963 | Vogel |
| 3,374,848 A * | 3/1968 | De Castelet ............. 180/41 |
| 3,563,270 A | 2/1971 | Denny ................ 137/625.21 |
| 4,373,744 A * | 2/1983 | Glaze ..................... 280/5.513 |
| 4,647,069 A * | 3/1987 | Iijima ..................... 280/5.514 |
| 4,756,548 A | 7/1988 | Kaltenthaler et al. ..... 280/702 |
| 4,809,957 A | 3/1989 | Schonfeld et al. ...... 267/64.11 |
| 4,817,922 A * | 4/1989 | Hovance ................ 267/64.21 |
| 4,966,196 A | 10/1990 | Meyer ................ 137/625.64 |
| 4,974,861 A | 12/1990 | Itoh et al. ................ 280/6.1 |
| 4,976,104 A | 12/1990 | Morris et al. ............. 60/412 |
| 5,048,867 A | 9/1991 | Gradert .................. 280/840 |
| 5,118,169 A | 6/1992 | Moller ................... 303/118 |
| 5,161,579 A | 11/1992 | Anderson, Jr. ......... 137/627.5 |
| 5,161,817 A | 11/1992 | Daum et al. ............. 280/714 |
| 5,211,449 A | 5/1993 | Amtsfeld ............... 303/9.66 |
| 5,375,819 A | 12/1994 | Galazin et al. ......... 267/64.16 |
| 5,472,227 A | 12/1995 | Schonfeld et al. ........ 280/714 |
| 5,484,162 A * | 1/1996 | Kanoh et al. ........... 280/6.157 |

(Continued)

FOREIGN PATENT DOCUMENTS

| DE | 1 144 125 | 7/1961 |
| FR | 2 483 337 | 12/1981 |
| FR | 2 687 350 | 8/1993 |

(Continued)

*Primary Examiner*—Paul N. Dickson
*Assistant Examiner*—Timothy Wilhelm
(74) *Attorney, Agent, or Firm*—St. Onge Steward Johnston & Reens LLC

(57) ABSTRACT

A trailing arm suspension for a vehicle. The trailing arm suspension having a height control system for controlling the ride height of the suspension relative to the vehicle. The height control system preferably comprises a motor driven height control valve.

36 Claims, 15 Drawing Sheets

U.S. PATENT DOCUMENTS

| | | | |
|---|---|---|---|
| 5,499,845 A | 3/1996 | Geiger et al. | 280/840 |
| 5,544,855 A | 8/1996 | Henken et al. | 251/121 |
| 5,560,591 A | 10/1996 | Trudeau et al. | 267/64.16 |
| 5,651,555 A | 7/1997 | O'Reilly et al. | 280/6.1 |
| 5,797,607 A * | 8/1998 | Kopczynski | 280/6.154 |
| 5,860,450 A | 1/1999 | Trudeau et al. | 137/627.5 |
| 6,089,551 A | 7/2000 | Haviland et al. | 267/64.16 |
| 6,220,566 B1 * | 4/2001 | Miller | 251/58 |
| 6,257,597 B1 * | 7/2001 | Galazin | 280/6.151 |
| 6,308,963 B1 * | 10/2001 | Lee | 280/5.514 |
| 6,679,509 B1 * | 1/2004 | Galazin et al. | 280/124.116 |
| 6,722,669 B1 * | 4/2004 | Stammreich | 280/5.514 |
| 6,991,239 B2 * | 1/2006 | Schutt et al. | 280/5.514 |
| 7,028,996 B2 * | 4/2006 | Plath | 267/64.17 |
| 2002/0096840 A1 * | 7/2002 | Sulzyc et al. | 280/5.514 |

FOREIGN PATENT DOCUMENTS

| | | |
|---|---|---|
| WO | WO 95/09093 | 4/1995 |
| WO | WO 95/29823 | 11/1995 |
| WO | WO 01/14156 A1 | 3/2001 |

* cited by examiner

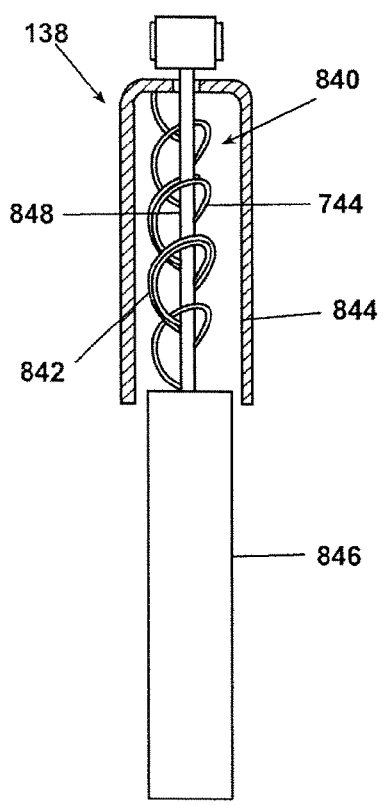
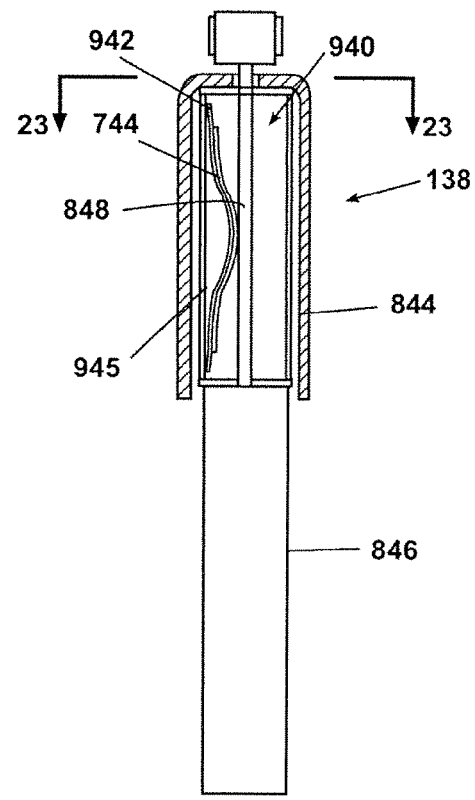
Fig. 21        Fig. 22
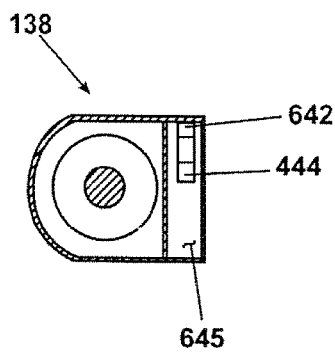
Fig. 23

TRAILING ARM SUSPENSION AND HEIGHT CONTROL SYSTEM WITH MOTORIZED VALVE THEREFOR

PRIORITY DOCUMENT

This application is a continuation of PCT International Application No. PCT/US02/16510 filed May 23, 2002, which claims the benefit of the filing date under 35 U.S.C. §119(e) of U.S. Provisional Patent Application Ser. No. 60/293,616 filed May 25, 2001.

FIELD OF THE INVENTION

In one aspect, the invention relates to a trailing arm suspension for a vehicle. In another aspect, the invention relates to a height control system for controlling the ride height of the suspension relative to the vehicle. In yet another aspect, the invention relates to a motor driven height control system.

BACKGROUND OF THE INVENTION

Trailing arm suspensions with mechanically linked and actuated height control valves are well known. FIG. 1 illustrates such a trailing arm suspension 10 in combination with a height control valve 12. The trailing arm suspension 10 comprises opposing trailing arm assemblies 11 mounted on opposite sides of the vehicle, preferably to the vehicle frame rails 16. Each of the trailing arm assemblies includes a trailing arm 14 having one end pivotally connected to a hanger bracket 18 by a pivotal connection 20. The hanger bracket is suspended from the vehicle frame rail 16. The other end of the trailing arm 14 mounts to an air spring 22, which is affixed to the frame rail 16. The air spring 22 dampens the pivotal rotation of the trailing arm 14 about the hanger bracket 18 relative to the frame rail 16.

An axle assembly 28 typically spans and mounts to, or is carried by, the trailing arms 14. The axle assembly 28 rotatably mounts ground-engaging wheels (not shown). Any movement of the wheels in response to their contact with the ground will result in a rotation of the trailing arms 14, which is resisted by the air springs 22.

The air springs 22 typically comprise an air bag 24 and a piston 26. The piston 26 is mounted to the trailing arm 14 and the air bag 24 connects the piston to the frame. Pressurized fluid can be introduced or exhausted to adjust the dampening performance of the air spring. Additionally, the volume of air in the air spring can be adjusted to alter the height of the frame rails relative to the trailing arms. Often, there is a preferred or reference ride height for the trailer and, depending on the load carried by the trailer or the operating environment, the actual or current ride height can vary over time. Pressurized air is introduced to or exhausted from the air bags to adjust the relative height of the trailer frame rail with respect to the trailing arms to maintain the ride height at the reference height for a particular load or environmental condition.

The adjustment of the ride height is accomplished by the height control valve 13, which has an inlet port, an operation port, and an exhaust port. The inlet port is fluidly connected to a source of pressurized air for the vehicle. The operation port is fluidly connected to the air bags 24 of the air springs and, the exhaust port is fluidly connected to the atmosphere. The height control valve controls the fluid connection of the operation port with the inlet port and the exhaust port to introduce or exhaust air from the air spring to thereby adjust the vehicle height.

The height control valve is typically mounted to the vehicle frame 16 and has a rotatable lever arm 32 that is operably connected to the trailing arm 14 through an adjustable rod 34, whereby any movement of the trailing arm 14 results into a corresponding movement of the lever arm to move the valve and connect the operation port to either of the inlet port or exhaust.

A traditional height control valve has three positions: an inflate position, a neutral position, and an exhaust position in the inflate position, the lever arm 32 is rotated up and the operation port is connected to the inlet port. In the neutral position, 20 the lever arm 32 is generally horizontal and the operation port is not connected to either the inlet or exhaust ports. In the exhaust position, the lever arm is rotated down and the operation port is connected to the exhaust port.

The various height control valves currently available can be operated on a time delay or can respond instantly to changes in height. The valve structure for these valves typically includes multiple spring biased pistons or similar elements that seal the various ports in response to the relative movement of the trailing arm. Examples of this type of height control valve are disclosed in U.S. Pat. No. 5,161,579, issued Nov. 10, 1992; U.S. Pat. No. 5,560,591, issued Oct. 1, 1996; and U.S. Pat. No. 5,375,819, issued Dec. 27, 1994.

These valves tend to use a seal in the form of an O-ring or the like that surround the dynamic or moving piston to seal the piston relative to the valve housing. These "dynamic" seals are subject to wear as the piston reciprocates, leading to their eventual failure.

Other suitable valves include valves without any dynamic seals. A group of these valves are referred to as shear valves and comprise abutting plates, one of which is movable relative to the other. The plates are retained together by the pressurized air from the vehicle air system, negating the need for any dynamic seals such as is disclosed in PCT/US00/23278, which is incorporated by reference.

The most commonly used current height control valves, regardless of their valve structure, are subject to damage because of the mechanical coupling between the trailing arm and the height control valve. The mechanical coupling is directly exposed to the environment of the trailing arm suspension, which can be very harsh. Additionally, most of the mechanically operated valves are susceptible to "freezing" if not used regularly.

In response to the disadvantages of the mechanically actuated and controlled height control valves, electronically controlled and actuated height control systems have been developed. The electrical-based systems form a small segment of the height control valve market. These electronically controlled systems typically use various sensors to monitor the vehicle height position and use electrically actuated valves, such as solenoid valves, to control the introduction and exhaustion of air from the air springs. A disadvantage of the electronically controlled systems is that they are more costly that the mechanical systems in component cost, maintenance cost, and operation cost. However, they are beneficial in that they tend to be more responsive to changes in the vehicle height.

Thus, there is still a need in the vehicle height control system to have a height control system with the low cost of the traditional mechanical systems in combination with the performance of the electronic systems.

SUMMARY OF THE INVENTION

A ride height control system for suspension that supports an axle which carries ground-engaging wheels relative to vehicle has been provided. The ride height control system maintains the vehicle at a reference ride height relative to the ground. The suspension comprises a height sensor that senses the current vehicle ride height and generates an output signal representative of the current ride height. An inflatable air bag is operably coupled between the axle and the vehicle whereby the introduction and exhaustion of air into and from the air bag increases and decreases, respectively, the relative distance between the axle and the vehicle to adjust the vehicle ride height. A source of pressurized air is provided for use in inflating the air bag. The valve selectively fluidly couples the air bag to the source of pressurized air or atmosphere to thereby introduce or exhaust air from the air bag, respectively.

The ride height control system is characterized by a valve actuator coupled to the height sensor and to the valve wherein the valve actuator receives as input the height sensor output signal and selectively actuates the valve between a neutral position, where the air bag is not fluidly connected to either the source of pressurized air or atmosphere, a fill position, where the air bag is fluidly connected to the source of pressurized air to introduce air into the air bag, and an exhaust position, where the air bag is fluidly connected to atmosphere to exhaust air from the air bag. By fluidly coupling the air bag to either of the source of pressurized air or atmosphere, the valve actuator enables the ride height control system to adjust the vehicle ride height relative to the reference ride height.

The valve actuator preferably comprises a controller that is programmed with a control logic. The controller uses the height sensor output signal in combination with the control logic to actuate the valve to adjust the ride height. A motor can be provided with the valve actuator and is operably coupled to the controller and connected to the valve, whereby the controller actuates the motor to selectively actuate the valve.

The motor preferably includes an output gear that is enmeshed with a transfer gear mounted to the valve annulment such that the actuation of the motor rotates the output gear to rotate the transfer gear and thereby move the valve between the fill and exhaust positions. The motor is preferably reversible and the controller operates the motor in a first direction to move the valve into the fill position and in a second direction to move the valve into the exhaust position. It is preferred that the output gear be a worm gear.

The sensor output signal is preferably a voltage signal that carries with it a positive or negative sign and the controller uses the sign of the voltage signal to determine the direction of operation of the motor. The control logic is such that the controller preferably maintains the vehicle ride height at the reference ride height. The controller uses the voltage signal sign as indicating whether the vehicle is above or below the reference ride height.

The valve preferably comprises an inlet port for connecting to the source of pressurized air, an air bag port for fluidly connecting to the air bag, an exhaust port for fluidly connecting to atmosphere, and a rotatable valve element having a control passage that selectively fluidly connects the air bag port to the inlet port or the exhaust port upon rotation of the valve element. The valve can also include a valve housing that defines an interior chamber to which the inlet port, air bag port, and exhaust port or fluidly connected.

The valve element can fluidly separate the inlet port and the exhaust port. In such a configuration, the pressurized air entering the housing from the inlet port will bias the valve element into sealing abutment against the valve housing.

The valve element is preferably a rotatable disc and can reside on a fixed disc mounted to the housing. The rotatable and fixed discs are preferably made from ceramic or other similar materials.

The height sensor is preferably a transducer including an optical sensor arrangement such as a light emitting diode or a laser and an optical encoder, a variable-capacitance sensor, a Hall Effect sensor such as a variable resistance sensor or a magnetostrictive sensor, an ultra-sonic sensor, or combinations thereof.

In another aspect, the invention relates to an adjustable height suspension for a vehicle. The suspension comprises an axle that carries ground-engaging wheels which are adapted to be movably mounted to the vehicle. A height sensor is provided that senses the current vehicle ride height and generates an output signal representative of the current ride height. An inflatable air bag is operably coupled between the axle on the vehicle whereby the introduction and exhaustion of air to and from the air bag increases and decreases, respectively, the relative distance between the axle and the vehicle to adjust the vehicle ride height. A source of pressurized air is used for inflating the air bag. A valve is provided for selectively fluidly coupling the air bag to the source of pressurized air or atmosphere to thereby introduce or exhaust air from the air bag, respectively.

The adjustable height suspension is characterized by a valve actuator coupled to the height sensor and the valve, wherein the valve actuator receives as input the height sensor output signal and selectively actuates the valve between a neutral position, where the air bag is not connected to either the source of pressurized air or atmosphere, a fill position, were the air bag is fluidly connected to the source of pressurized air to introduce air into the air bag, and an exhaust position, were the air bag is fluidly connected to atmosphere to exhaust air from the air bag and thereby adjust the ride height based on the current ride height sensed by the height sensor.

BRIEF DESCRIPTION OF THE DRAWINGS

In the drawings:

FIG. 21 illustrates a sixth embodiment height sensor according to the invention in the context of a shock absorber;

FIG. 22 illustrates a seventh embodiment height sensor according to the invention; and FIG. 23 is a sectional view taken along line 23—23 of FIG. 22.

DETAILED DESCRIPTION OF THE INVENTION

Figure 2:
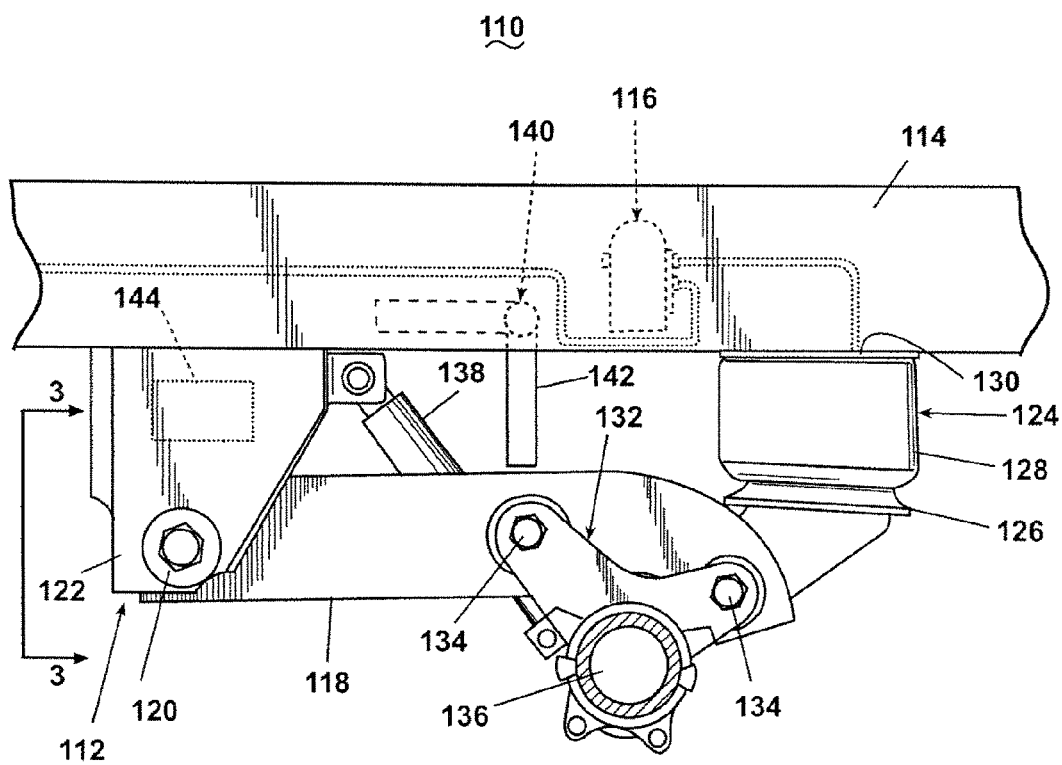
FIG. 2 is an elevational side view of a trailing arm suspension with a height control system according to the invention comprising a height sensor coupled to a motorized height control valve by a controller.

FIG. 2 illustrates a trailing arm suspension 110 according to the invention. The trailing arm suspension comprises a pair (only one shown) of trailing arm assemblies 112 mounted to a vehicle frame 114 and incorporating a motorized height control valve 116 according to the invention. The trailing arm assembly 112 comprises a trailing arm 118 having one end pivotally mounted through a bushed connection 120 to a frame bracket 122 depending from the vehicle frame 114. An air spring 124 comprising a piston 126 mounted to a portion of the trailing arm 118 and an airbag 128 mounted to the frame 114 through a plate 130 connects the trailing arm 118 to the vehicle frame 114. An axle bracket 132 is mounted to the trailing arm 118 between the frame bracket 122 and the air spring 124 by a pair of bushed connectors 134. The axle bracket mounts an axle 136 to which the ground engaging wheels (not shown) of the vehicle are rotatably mounted. A shock absorber 138 extends between the axle bracket 132 and the frame bracket 122.

Although the basic operation of a trailing arm suspension is widely known, a brief summary may be useful in understanding the following disclosure. As the wheels (not shown) of the vehicle encounter changes in the road surface, they apply a reactive force to the trailing arm 118, pivoting the trailing arm 118 relative to the frame bracket 122 and the vehicle frame 114. The pivoting movement of the trailing arm 118 is dampened by the air spring 124.

In addition to dampening the rotational movement of the trailing arm 118, the air spring 124 is also used to adjust the height of the frame 114 relative to the ground. For example, assuming static conditions, as air is introduced into the airbag 128, the vehicle frame 114 is raised relative to the trailing arm 118, since the trailing arm 118 is effectively fixed relative to the ground because of the contact between the ground engaging wheels. Similarly, if pressurized air is exhausted from the airbag 128 the vehicle frame 114 will lower in height relative to the ground.

An anti-creep device 140 is provided on the vehicle frame 114 and functions to limit the rotation of the trailing arm 118 during loading, which lowers the height of the vehicle frame. This phenomenon is known as trailer creep in the art and occurs because the air supply to the air springs is typically shut off during loading. As more weight is added to the trailer, the air spring cannot be inflated to counter the increase weight, resulting in the lowering of the frame. As the frame lowers, the trailing arm is effectively pivoted about the bushed connection, which results in the wheels rotating and causing the trailer to move away from the dock.

The anti-creep device 140 comprises a stop arm 142 that is rotatably mounted to the vehicle frame 114. The stop arm can be rotated from a retracted position (as shown in phantom lines) to an extended position, where the end of the stop arm 142 is positioned above the trailing arm 118 and limits the upward rotation of the trailing arm 118 relative to the vehicle frame. The movement of the stop arm 142 between the retracted and extended positions is typically controlled by a pneumatic actuator (not shown) that is responsive to the introduction or exhaustion of pressurized air from the actuator. This type of anti-creep device 140 is well known and will not be described in further detail.

A height control sensor 144 is mounted to the frame bracket 122 and is operably connected to the trailing arm 118 so that the sensor 144 monitors the orientation of the trailing arm and outputs a signal corresponding to that orientation. The height control sensor 144 is electrically coupled to the motorized height control valve 116 to supply the height control valve 116 with a signal indicating the position of the trailing arm.

Figure 3:
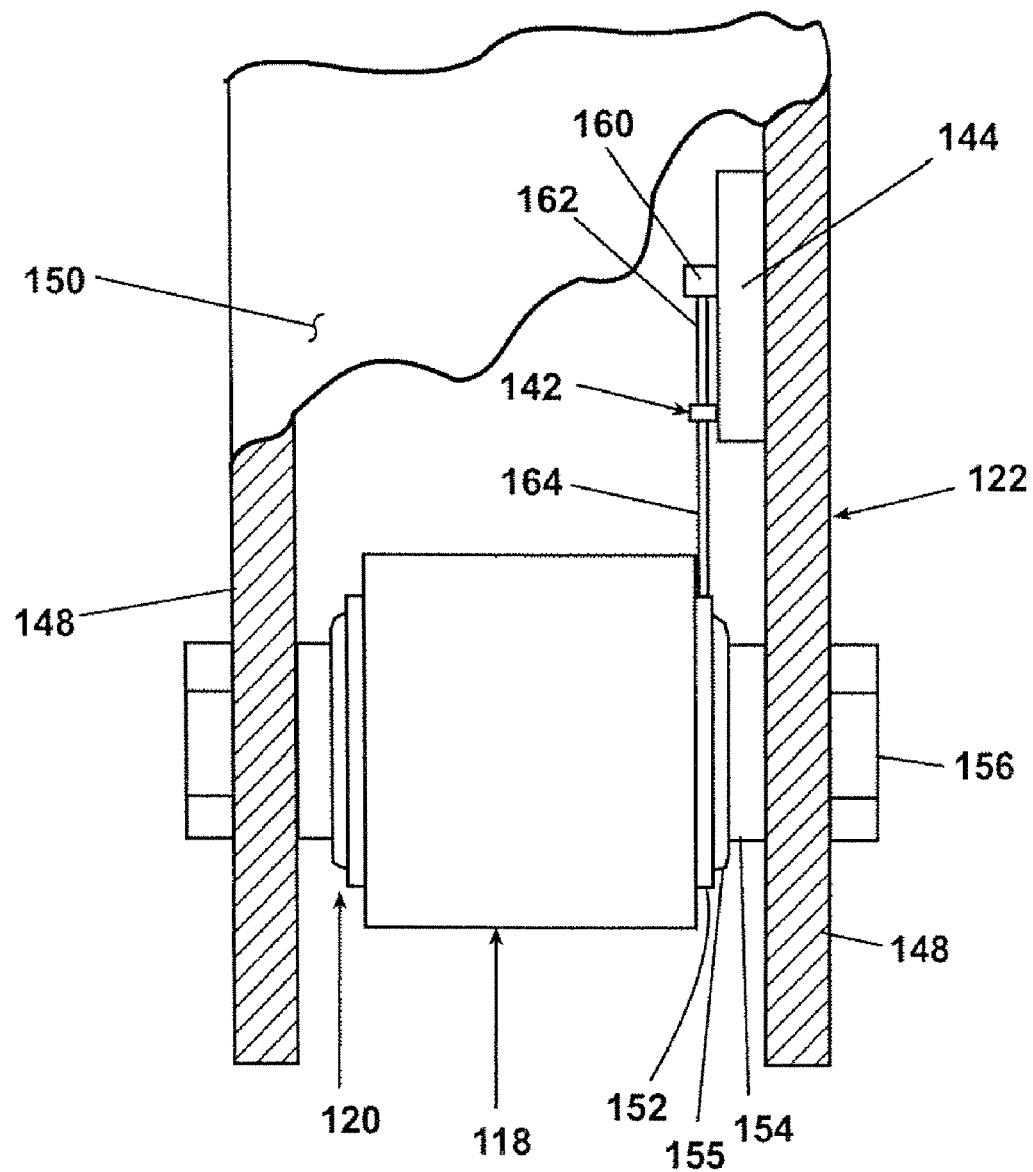
FIG. 3 is a partially cut away end view taken along 3—3 of FIG. 2 illustrating the mechanical connection between the height sensor and the trailing arm suspension.

Referring now to FIGS. 2 and 3, the sensor 144 is fixedly mounted to the interior of the frame bracket 122 and mechanically coupled to the bushed connector 120 through a link 146. The frame bracket 122 has opposing sidewalls 148 that are connected by an end wall 150. The bushed connector 120 comprises an outer sleeve 152 that is press-fit within the trailing arm 118 and inner sleeve 154 that is concentrically received within the outer sleeve 152. An annulus of elastomeric material 155 is compressively retained between the outer sleeve 152 and the inner sleeve 154. The ends of the inner sleeve 154 abut the inner surfaces of the sidewall 148 respectively. A mounting bolt 156 compressively mounts the sidewall 148 against the ends of the inner sleeve 154 to fix the inner sleeve relative to the frame bracket 122. With this construction, the pivotal movement of the trailing arm results in the rotation of the outer sleeve 152 relative to the inner sleeve 154. The rotation is accomplished by the elastomeric annulus 155, which enables the outer sleeve 152 to rotate relative to the inner sleeve 154.

The sensor 144 contains a external shaft 160 that is coupled to the link 146, which is connected to the outer sleeve 152. The link 146 can have any suitable shape so long as the rotational movement of the outer sleeve is correspondingly transferred to the rotation of the external shaft 160. For example, the link can comprise arms 162, 164 which are connected by one of the arms having a pin that is received in a slot in the end of the other arm, thereby the rotational movement of the outer sleeve is correspondingly transferred to the external shaft 160 of the sensor 144 while accommodating any relative vertical movement between the anus 162, 164.

Figure 4:
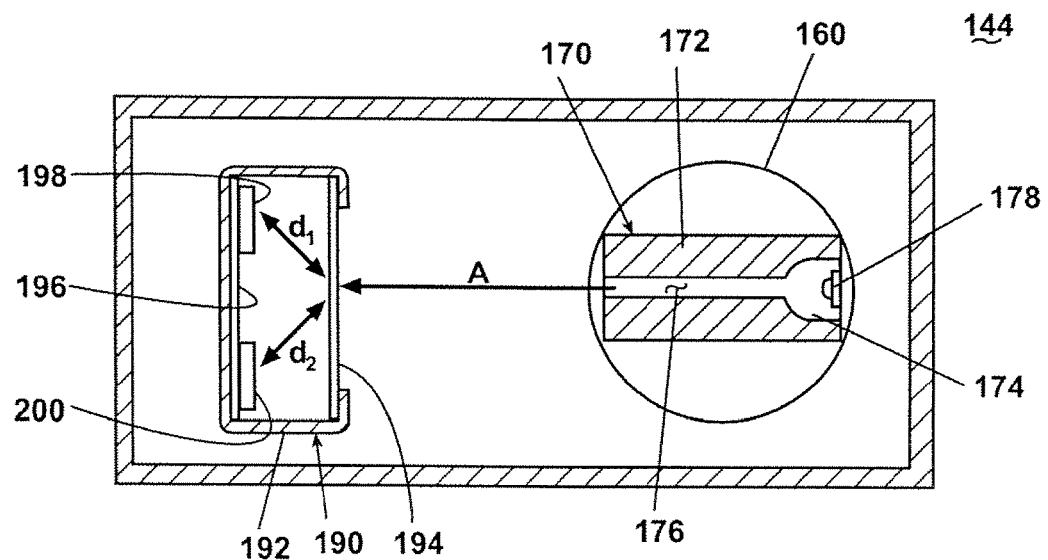
FIG. 4 is a sectional view of the sensor in FIGS. 2 and 3 and illustrating a light emitter for the sensor in a reference position relative to an optical bridge of a light sensor assembly.
Figure 5:
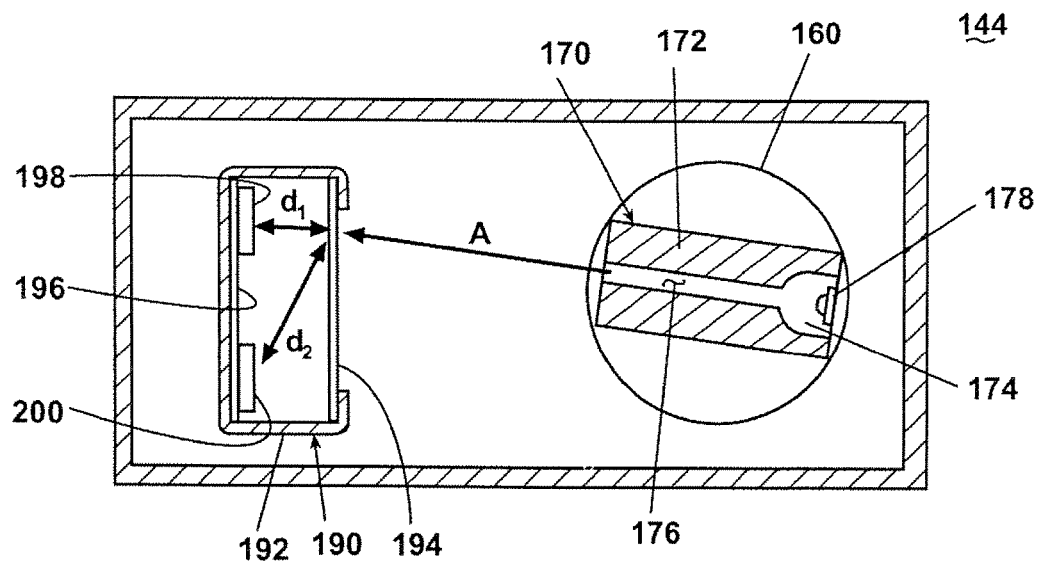
FIG. 5 is identical to FIG. 4 except that the light emitter is shown in an alternative position relative to the optical bridge.

FIGS. 4 and 5 illustrate a preferred form of the sensor 144. The sensor 144 comprises a light emitter 170 that is mounted to the external shaft 160. The light emitter 170 preferably is formed from a solid block 172 of metal or plastic having a light source chamber 174 and a light passage 176 optically connecting the light chamber 174 to the exterior of the light emitter 170. A light source 178, such as a light emitting diode or a laser, is positioned within the light chamber 174 and emits light that exits the block 172 through the light passage 176 along path A.

The height sensor 144 further includes a light sensor assembly 190 comprising a light-tight housing 192 having an open end in which is fixedly placed a diffusing element 194, such as frosted glass. A light detector in the form of an optical bridge 196 is positioned within the light-tight housing 192 behind the defusing element 194. The optical bridge 196 includes two spaced sensors 198, 200, which can be photoconductive cells or photodiode detectors. Each light sensor outputs a voltage signal representative of the intensity of the light they receive. The voltage signals and their differences are used to assess a change in the vehicle height. The optical bridge 196 is preferably a Wheatstone bridge circuit using photoconductive cells in either a half bridge (2 cells) or a full bridge (4 cells) arrangement.

The operation of the light sensor 144 is best described by reference to FIGS. 4 and 5. FIG. 4 illustrates the position of the light emitter 170 when the vehicle is at the reference ride height. It should be noted that although FIG. 4 illustrates the light emitter 170 being oriented substantially perpendicular to the light sensor assembly 190 when the vehicle is at the reference ride height, the light emitter 170 can be oriented at an angle relative to the light sensor assembly 90 to establish the reference ride height.

In the reference position shown in FIG. 4, the light emitter 170 emits a beam of light along path A. As the beam of light contacts the diffuser element 194 of the light sensor assembly 190, rays of diffused light contact the spaced light sensors 198. The rays of light travel a distance D1 and D2 from the diffuser element 194 to the light sensors 198, 200, respectively. The distance the light travels impacts the intensity of the light as seen by the light sensors, resulting in a corresponding voltage output from the sensors.

Referring to FIG. 5, if the height of the vehicle is changed, such as by loading or unloading product from the vehicle, the trailing arm 118 will rotate relative to the frame bracket 122, resulting in a corresponding rotation of the outer sleeve 152, which results in a corresponding rotation of the external shaft 160 of the height sensor 144. As the height sensor external shaft 160 rotates, the light emitter 170 is rotated into a new position and the light beam A strikes the diffuser element 194 at a different location. The rays of light emanating from the diffuser element 194 and entering the light sensors 198 now must travel through distances D3 and D4. As can be seen by comparison with the distances D1, D2, the distance D3 for the light ray to enter the sensor 198 is less than the previous distance D1. Conversely, the distance D4 is greater than the distance D2 for the light to enter light sensor 200. The result of the change in the position of the light emitter 170 from FIG. 4 to FIG. 5 results in the sensor 198 receiving a higher intensity light and the sensor 100 receiving a lower intensity light. The change in the intensity corresponds to a change in the voltage output signal of the light sensors 198, 200. The change in the output signals from the sensors, 198, 200 is directly related to the rotational change in the trailing arm 118 relative to the vehicle frame 114 and provides a measure for the change in height of the vehicle from the predetermined position. The output from the light sensors 198, 200 can be used to control the introduction and exhaustion of pressurized air into the air springs to raise or lower the vehicle frame until the light emitter 170 is rotated back to the reference position.

Figure 6:
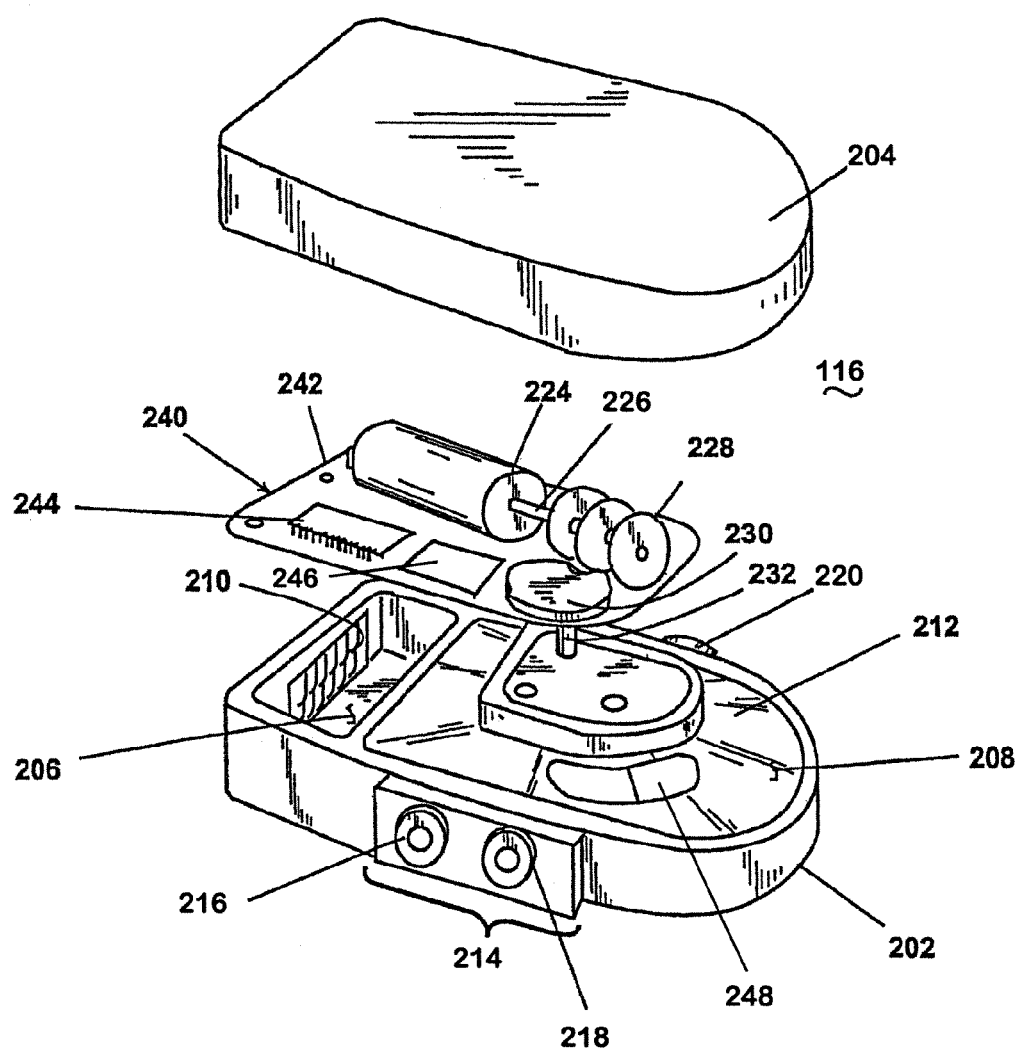
FIG. 6 is an exploded perspective view of a motorized height control valve according to the invention with a portion of the housing removed for clarity.

FIG. 6 illustrates the components of the motorized height control valve 116 according to the invention. The motorized height control valve 116 comprises a two-piece housing having a base 202 and a cover 204, which is shown removed from the base 202. The base 202 is functionally divided into two portions: an electrical connection portion 206 and a fluid control portion 208. The electrical connection portion 206 comprises an input/output interface 210, which has the necessary electrical connections to connect the height control sensor 144 and any other sensors. The fluid control portion 208 comprises a valve assembly 212 and a fluid manifold 214, having an inlet port 216 and an operation port 218. An exhaust port 220 is provided on the opposite side of the base 202 than the inlet port 216 and the operation port 218. The valve assembly 212 controls the flow of fluid to and from the operation port 218 from either the inlet port 216 or to the exhaust port 220 to thereby control the introduction and exhaustion of pressurized air to and from air spring 124.

A valve actuator 222 is operably connected to the valve assembly 212. The valve actuator 222 comprises an electric motor 224 having an output shaft 226 on which is mounted a drive gear 228. A transfer gear 230 is coupled to the drive gear 228 and has a control shaft 232 that is coupled to the valve assembly, whereby the actuation of the motor 224 rotates the drive gear 228, which through the transfer gear fluid communication between the operation port 218 and either the inlet port 216 or the exhaust port 220.

A controller 240 is also provided within the motorized height control valve 116. Preferably the controller 240 is formed by circuit board 242 on which the motor 224 and transfer gear 230 are mounted. A microprocessor 244 is provided on the circuit board 242 and is electrically coupled to the input output interface 210 and to 30 the motor 224. A valve position sensor 246 is also provided on the circuit board 242 and is electrically coupled to the processor 244. The valve position sensor 246 includes an actuator 248 located on the valve assembly 212.

Figure 7:
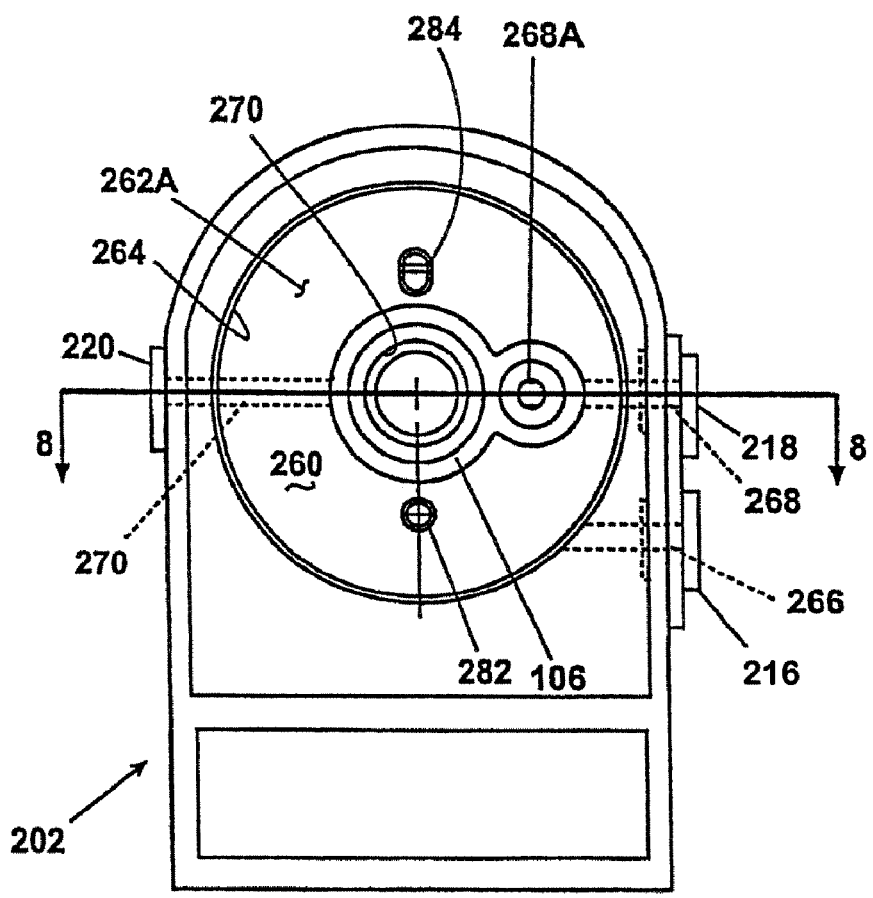
FIG. 7 is a top view of the height control valve housing of FIG. 6 with the cover and valve assembly removed for clarity.
Figure 8:
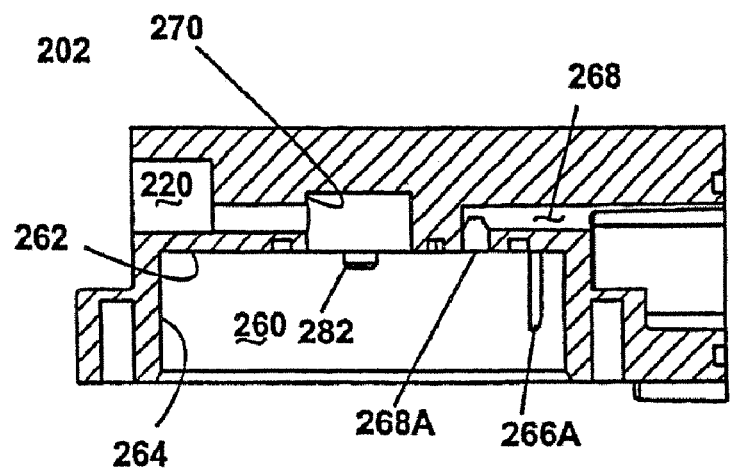
FIG. 8 is a sectional view taken along line 8—8 of FIG. 7 illustrating, the flow 20 paths through the housing.

Referring to FIGS. 7 and 8, the base 202 is shown with the valve assembly 212 removed. The base 202 comprises an interior chamber 260, open on one side for receiving the valve assembly. The interior chamber 260 is partially defined by an interior housing side wall 262 and an interior peripheral wall 264, which extends away from the side wall 262. An air supply conduit 266 and an air spring conduit 268 extend from the chamber 260 to the inlet port 216 and the operation port 218, respectively. The air supply conduit forms a slot-like opening 266A in the peripheral wall 264. The air spring conduit forms an opening 268A in the wall 262. An exhaust conduit 270 extends from the exterior of the base 202 to exhaust port 220.

The air supply conduit 266 is adapted to fluidly connect a source of pressurized air to the interior chamber 260. The air spring conduit 268 fluidly connects the interior chamber 260 to the air bag 128. The exhaust conduit 270 fluidly connects the chamber 260 to the atmosphere.

Figure 9:
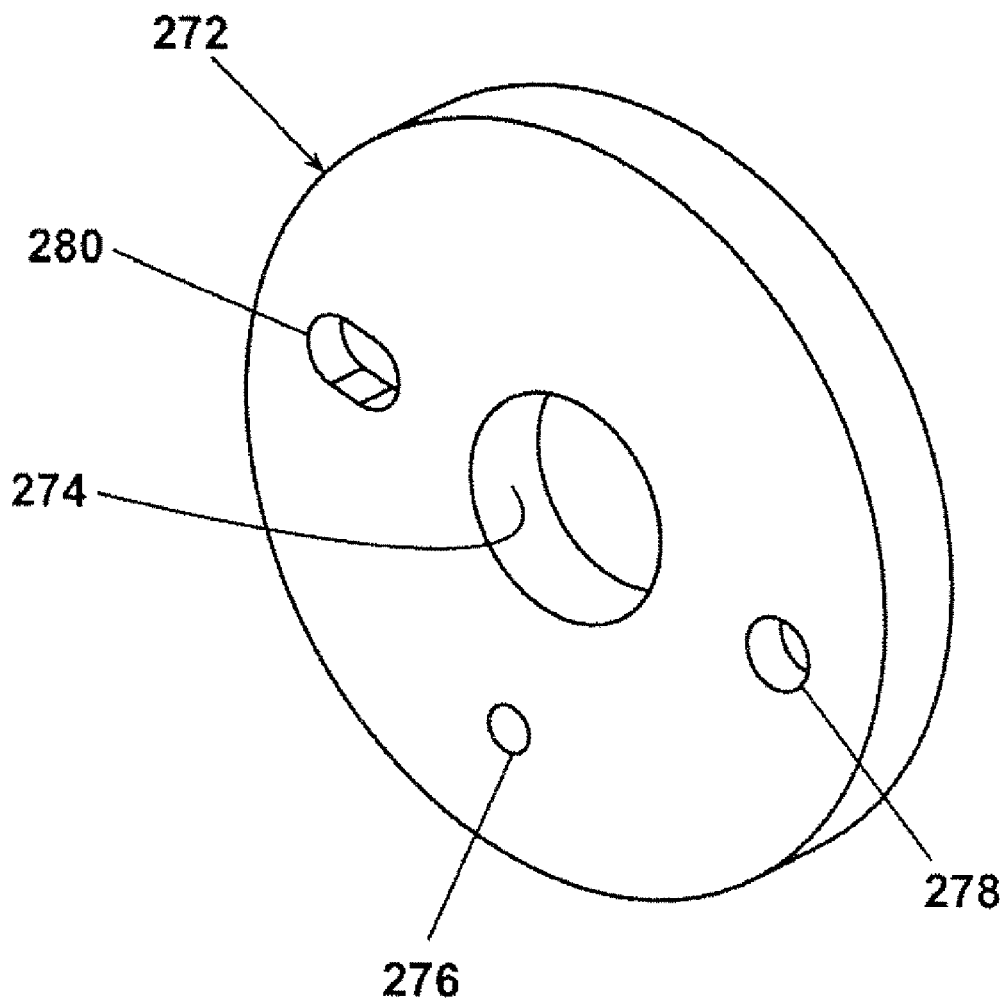
FIG. 9 is an enlarged perspective view of a stationary shear disk of the valve assembly in FIG. 7.
Figure 10:
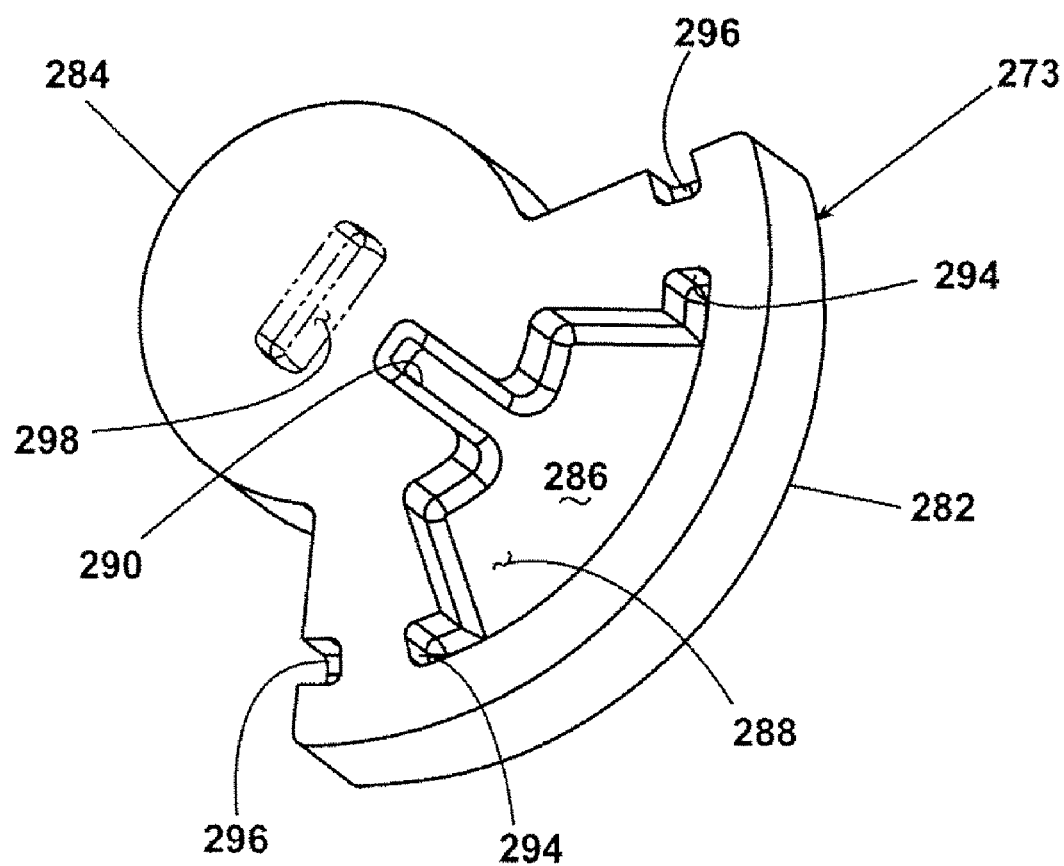
FIG. 10 is a perspective view showing a dynamic shear disk of the valve assembly of FIG. 7.

Referring to FIGS. 9 and 10, the valve assembly 212 comprises a shear valve including a static shear disk 272 and a dynamic disk 273. The static disk 272 has an axial passage in the form of an opening 274 and a fluid passage in the form of an orifice 276, both of which extend through the disk 272. The static shear disk 272 includes blind alignment openings 278 and 280 that receive positioning studs 282 and 284 extending from the base 202 into the interior chamber 260 to align the static shear disk 272 relative to the base 202 so that orifice 276 aligns with the opening 268A of the air spring conduit 268. The axial opening 274 aligns with the exhaust conduit 270. Thus, the orifice 276 and the axial opening 274 establish fluid communication between the upper surface of the static disk 272 and the operation port 218 and the exhaust port 220.

Referring to FIG. 10, the dynamic shear disk 273 is viewed from its lower surface. The dynamic shear disk 273 is positioned within the interior chamber 260 of the base 202 so that the lower surface of the dynamic shear disk is in abutting relationship with the upper surface of the static, shear disk 270. The dynamic shear disk 273 comprises a sector portion 282 from which extends a circular lobe 284. A passage in the form of a generally T-shaped recess 286 is formed in the dynamic shear disk 273 and comprises an arcuate portion 288 and a channel 290. The arcuate portion 288 is predominantly located in the sector portion 282 and includes opposing outlet profile slots 294. An inlet profile slot 296 is provided on the exterior side of the sector portion 282 and corresponds with one of the outlet profile slots 294. A blind slot 298 is formed in the upper surface of the dynamic shear disk 273 and is sized to receive the end of the control shaft 232.

When assembled, the orifice 276 of the shear disk 272 will lie between one of the pairs of outlet profile slots 294 and inlet profile slots 296. The blind slot 298 receives a lower end of the control shaft 232. The channel 290 fluidly connects the arcuate portion 288 and the outlet profile slots to the exhaust port 220 through the exhaust conduit 270.

Figure 11:
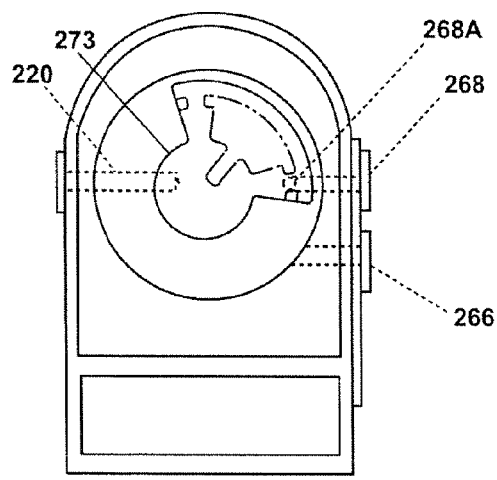
FIG. 11 is a schematic view illustrating the height control valve of FIG. 7 in a neutral position.
Figure 12:
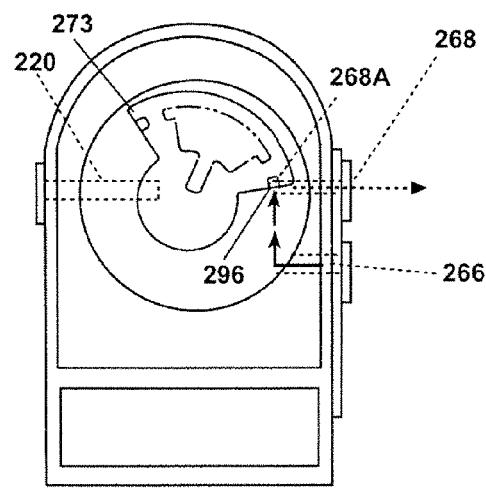
FIG. 12 is a schematic view illustrating the height control valve of FIG. 7 in a fill position.
Figure 13:
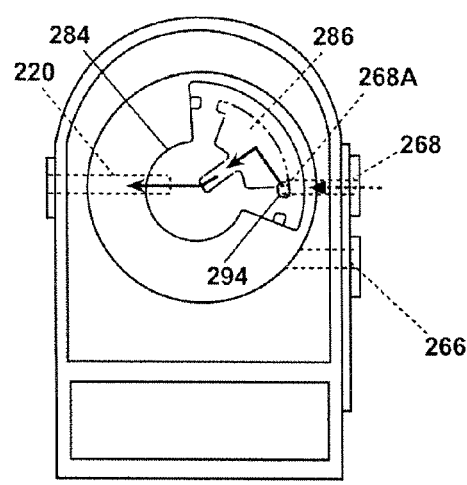
FIG. 13 is a schematic view illustrating the height control valve of FIG. 7 in 30 an exhaust position.

FIGS. 11–13 illustrate the three major operational positions of the shear valve: fill position, neutral position, and exhaust position. For purposes of this description, it will be assumed that the height control valve begins in the neutral position. In the neutral position shown in FIG. 11, the dynamic shear disk 273 is oriented relative to the shear disk 272 such that the shear disk orifice 276 is positioned between the interior slot 294 and the exterior slot 296 and in abutting relationship with the dynamic shear disk 273, effectively sealing the opening 268A of the air spring conduit 268 and blocking fluid communication from either the air supply port 266 or exhaust conduit 270 to the air spring conduit 268.

If for any reason there is relative movement of the trailing arm 118 towards the vehicle frame 114, such as an increase in the loading of the trailer, the valve 116 is moved to the fill position as illustrated in FIG. 12 to introduce air into air bag 128 to raise the vehicle frame 114 relative to the trailing arm 118. As viewed in FIG. 12, under such conditions, the motor 224 rotates the dynamic shear disk 273 so that the orifice 276 moves into fluid communication with the exterior slot 296 to open the air spring conduit 268 to the interior chamber 260. Since the interior chamber 260 is constantly exposed to the air supply port 266, pressurized air will be directed into the air spring conduit 268 and introduce pressurized air into air springs 124.

If the trailing arm 118 and vehicle frame 114 move away relative to each other, such as in the unloading of goods from the trailer, air must be exhausted from air bags 128 to move vehicle frame 114 back to its reference height. As viewed in FIG. 13, under such circumstances the valve is moved to the exhaust position by the motor 224 moving the dynamic shear disk 273 relative to the shear disk 272, so that the interior slot 294 is brought into fluid communication with the orifice 276. In the exhaust position, the air spring conduit 268 is in fluid communication with the exhaust conduit 270 through the channel 290.

Figure 14:
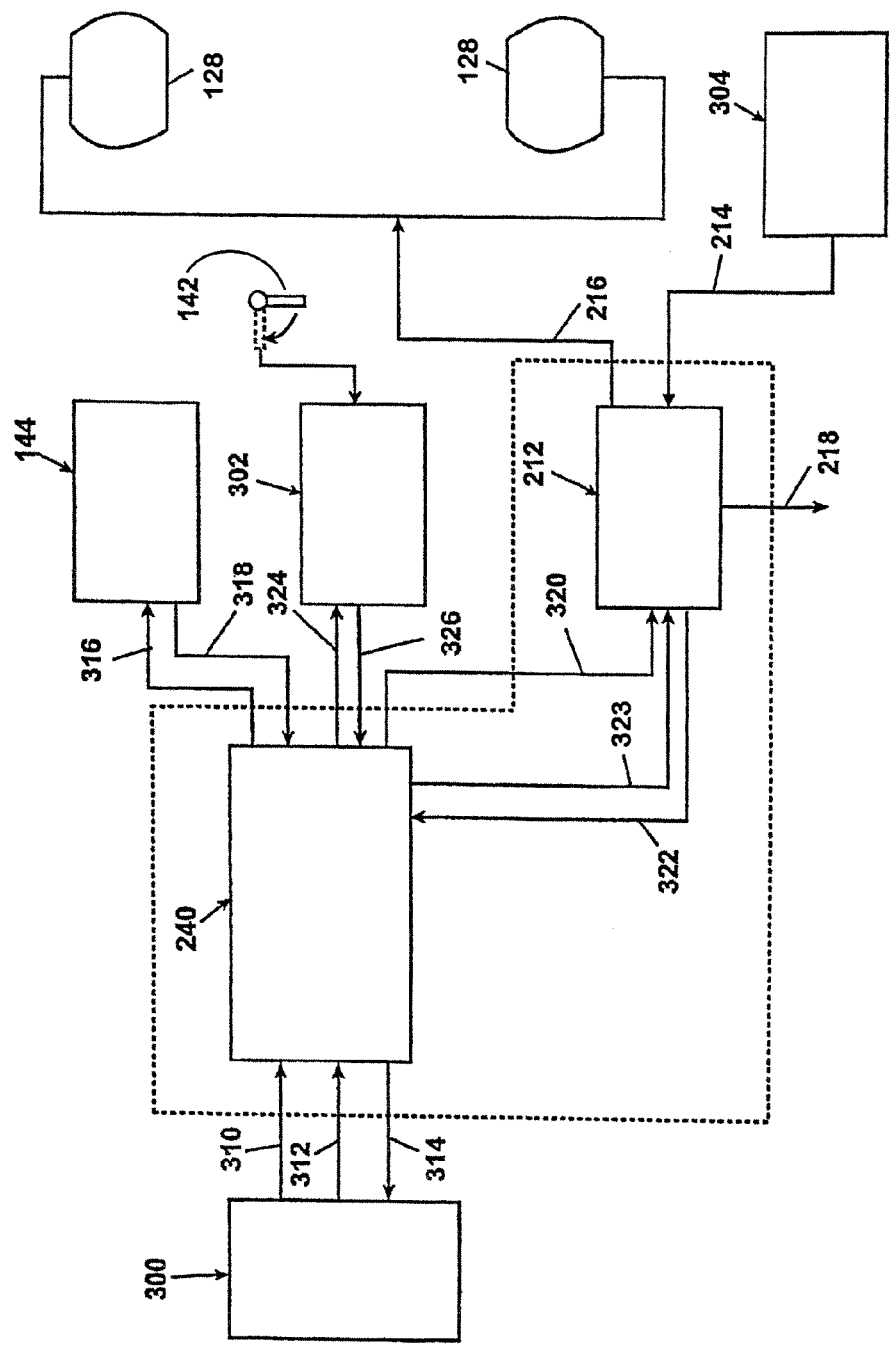
FIG. 14 is a block diagram of the control according to the invention.

FIG. 14 is a schematic illustration of the height control system for the suspension 110 and shows the interconnection between a master vehicle controller 300, the suspension controller 240, height sensor 144, and valve assembly 212. The schematic also includes a sensor 302 for the sensing the position of the arms 142 of the anti-creep device. An air reservoir 304 is provided and supplies pressurized air to the suspension air system and the brake air system.

The master vehicle controller 300 controls the operation of many of the vehicles operational features. The master vehicle controller 300 is typically connected to multiple discrete controllers that control the operation of a particular operational feature, such as the suspension controller 240. The master vehicle controller 300 includes a power conduit 310 that supplies power to the suspension controller 240. Data connections 312, 314 provide data to (output) and receive data from (input), respectively, the suspension controller 240. Preferably, output connection 312 sends a user selected function/mode data signal from the master controller 300 to the suspension controller 240, which the suspension controller 240 uses to determine its mode of operation. The input connection 314 preferably provides the master controller 300 with height data, mode data, and/or air data from the suspension controller 240.

The height sensor 144 comprises a power connection 316 that provides electrical power from the suspension controller 240 to the height sensor 144. A data connection 318 supplies an input signal to the suspension controller 240 that is indicative of the current height of the vehicle.

The valve assembly 212 comprises a power connection 320 that provides electrical power from the suspension controller 240 to the valve assembly 212. A data connection 322 supplies an input signal to the suspension controller 240 that is indicative of the position of the dynamic disk relative to the stationary disk. A drive connection 323 supplies a data signal from the suspension controller 240 to the valve assembly 212 for controlling the operation of electric motor 224. As previously described, the inlet port 216 of height control valve 116 is fluidly connected to a pressurized air reservoir 304 for the vehicle. Similarly, operation port 218 is fluidly connected to the air spring 124. Exhaust port 220 is fluidly connected to the atmosphere.

A power connection 324 supplies power from the suspension controller 240 to the sensor 302. As with the other sensors, a data connection 326 provides the suspension controller 240 with an input signal indicative of the arm 142 position. Many suitable sensors are available for and are currently used to sense the position of arm 142. Given that arm 142 is actuated by the release of pressurized air from the air-operated parking brakes, a common sensor is a pressure switch that outputs an electrical signal when the air is exhausted from the parking brakes.

The suspension controller 240 includes a memory, preferably a non-volatile memory that contains the necessary logic for operating the vehicle suspension, especially the control of the vehicle height. The controller 240 also incorporates a filtering algorithm that is used to process the data received from the height sensor 144 to eliminate frequent changes, which are normally indicative of temporary height changes and thereby avoid adjusting the vehicle height unnecessarily. Expansion joints in the road surface and other repeating or non-repeating aberrations are examples of frequent changes in the vehicle height for which it is not desirable to alter the ride height of the vehicle.

The need to avoid unnecessarily adjusting the vehicle height is important to the operation of the vehicle. Governmental regulations require that the brake air line be separated from all other air lines, including the suspension air line. On most vehicles there are just two air lines or air systems: a brake air line and a suspension air line, which also supplies air to any air-operated accessories. Most air systems draw the pressurized air for both systems from the same air reservoir 304 by using a valve (pressure protection valve) that provides air only to the brake air line once the pressure in the air reservoir drops below a predetermined amount. If the vehicle height is adjusted unnecessarily, such as in response to temporary height changes, it is possible to draw pressurized air from the air reservoir 304 at a rate greater than the on-board compressor can re-fill the air-reservoir, leading to a premature and unnecessary shut down of the height control system, until the air pressure is raised above the threshold value.

In operation, the vehicle user initially selects the operating mode of the suspension, which is then transmitted to the suspension controller 240. The mode selection can include a predetermined vehicle right height. Alternatively, the preferred ride height and the input the by user can be set equal to the current ride height. Once the initial operating mode and the vehicle ride height is set, control of the suspension 114 is then passed off to the suspension controller 240.

Although the suspension controller 240 can control many suspension related operations, for purposes of the height control system according to the current invention, the most relevant operation controlled by the suspension controller 240 is the control of the vehicle ride height in response to the ride height data supplied by the height sensor 144 and the corresponding adjustment of the vehicle ride height by controlling the volume of the area in air bags 128 of air springs 124. The suspension controller 240 preferably receives a stream of ride height data from the height sensor 144 through the data connection 318. The stream of ride height data is analyzed by the suspension controller 240 to monitor both the high frequency and low frequency changes in the ride height. Preferably, the suspension controller 240 applies a filter to the stream of ride height data to remove data points related to high frequency changes in the vehicle ride height, which are typically introduced by phenomena that do not warrant a change in the current ride height.

The filtered ride height data is then monitored and compared against the reference vehicle ride height. Once the change in the current ride height exceeds the reference ride height by a predetermined amount "Delta," the suspension controller 240 adjusts the current vehicle ride height accordingly by either introducing or exhausting pressurized air from the air spring 124. Usually, the current ride height is monitored over a predetermined time period "Sample Time" to insure that the change in the current ride height relative to the reference ride height is not transient. If the current ride height exceeds Delta for the Sample Time, it is normally an indication that there has been a permanent change in the vehicle ride height and that the current ride height, should be adjusted to the reference ride height. It is worth noting that the absolute value of Delta is normally the same regardless of whether the current ride height is above or below the reference ride height. However, it is within the scope of the invention for Delta to have a different value depending on whether or not the current ride height is above or below the reference ride height. It should also be noted that the value for Delta is typically user defined and can vary depending on the vehicle, suspension, operating environment or other factors.

If the current ride height is above the reference ride height an amount greater than Delta for the Sample Time, the current ride height is too high and must be lowered to the reference ride height. To move the suspension to the reference ride height, the suspension controller 240 sends a control signal along connection 323 to the valve assembly 212 to energize the motor 224 and thereby effect of the rotation of the dynamic disk 273 to move the valve to the exhaust position where the operation port 216 is in fluid communication with the exhaust port 212 to exhaust air from air bags 128 and lower the current ride height to the reference height. The suspension controller 240 continues to receive height data from the height sensor 144 while the air is being exhausted from air bag 128 through the valve assembly 212. When the suspension controller 240 determines from the height data that the current vehicle height substantially equals the reference ride height, the suspension controller 240 sends a control signal to the motor 224 to move the dynamic shear disk 273 back to the neutral position to stop the exhaustion of air from air bag 128.

If the current ride height is below the reference ride height an amount greater than Delta for the Sample Time, the current ride height is too low and must be raised to the reference ride height. To move the suspension to the reference ride height, the suspension controller 240 sends a control signal along connection 323 to the valve assembly 212 to energize the motor 224 and thereby effect of the rotation of the dynamic disk 273 to place the valve in the fill position where the operation port 218 is in fluid communication with the inlet port 216 to introduce air to air bags 128 and raise the current ride height to the reference ride height. The suspension controller 240 continues to receive height data from the height sensor 144 while the air is being introduced into air bag 128 through the valve assembly 212. When the suspension controller 240 determines from the height data that the current vehicle height substantially equals the reference ride height, the suspension controller 240 sends a control signal to the motor 224 to move the dynamic shear disk 273 back to the neutral position to stop the introduction of air into air bag 128.

Preferably, the suspension controller 240, through its program logic, monitors the rate of change of the ride height as it approaches the reference ride height to avoid overshooting the reference ride height, which if great enough, might require further adjustment of the vehicle ride height in the opposite direction. In a worst case scenario, this could lead to a yo—yo effect where the ride height continuously moves above and below the reference height, which would most likely lead to a drop of the air pressure in the air reservoir 304 below the threshold value.

Although there are many ways in which the suspension controller 240 can send a control signal to the valve assembly 212 to effect the actuation of the electric motor 224 to control the position of the dynamic disk 273 and thereby control the introduction and exhaustion of pressurized air from air bag 128, it is preferred that the suspension controller 240 and a control signal have either a positive or negative voltage. The sign of the voltage signal may for instance, correspondingly control the forward or reverse operation of electric motor 224. In combination with the positive or negative voltage signal, the suspension controller 240 receives a data stream along connection 322 regarding the position of the dynamic shear disk 273. The position information is used to determine the position of the dynamic shear disk 273 and provide the suspension controller 240 with the information needed to determine the appropriate sign of the voltage signal needed to move the dynamic shear disk 273 to the needed location to place the valve in the fill, neutral, or exhaust position.

Figure 15:
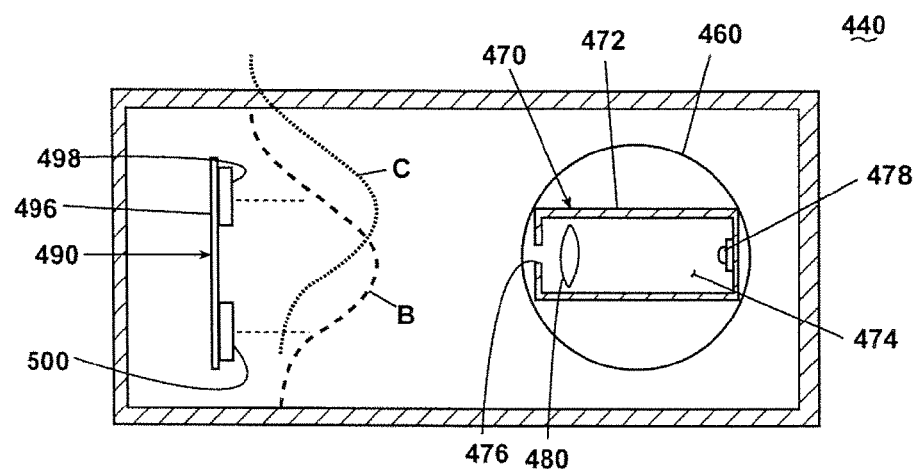
FIG. 15 illustrates a second embodiment height sensor according to the invention.

FIG. 15 illustrates a second embodiment height sensor 440 for use with the invention. The height sensor 440 is similar in many ways to the first embodiment height sensor, therefore like numerals will be used to identify like parts and only the major distinctions between the first and second embodiments will be discussed in detail. The height sensor 440 comprises a light emitter 470 that is mounted to the external shaft 160 and emits a diffracted light pattern onto a light sensor 490. The light emitter 470 comprises a block 472 having a light chamber 474 and diffraction slit 476 optically connecting the light chamber 474 to the exterior of the block 472. A light emitter, such as an LED or diode laser is disposed within the light chamber 474. A collimating lens is disposed between the light source 478 and the diffraction slit 476.

A light sensor assembly 490 comprises an optical bridge 496 having spaced light sensors 498, 500. The optical bridge 490 is not enclosed within a housing as was the first embodiment. Also, there is no diffuser element positioned between the optical bridge 496 and the light emitter 470.

The light emitter 470 emits a diffraction pattern as illustrated by the dashed line B. The dashed line B represents the intensity of the light relative to the light sensors 498, 500. As can be seen, in the reference position as illustrated in FIG. 7, the greatest intensity of the diffraction pattern is substantially centered between the light sensors 498, 500. The light sensors 498, 500 are preferably positioned so that they see the portion of the diffraction pattern that is approximately 50% of the maximum intensity. As the external shaft 460 rotates in response to the change in the vehicle height, the diffraction pattern moves laterally relative to the optical bridge 496 as illustrated by diffraction pattern C. The movement of the diffraction pattern alters the intensity of light as seen by the sensors 498, 500. The optical bridge 496 outputs a voltage signal that corresponds to the intensity as currently seen by the optical sensors 498, 500. This output signal is processed in the same manner as the output signal for the first embodiment as previously described.

For the second embodiment, it is preferred that the light emitter be either a high output narrow band infrared LED (approximately 940 nm) or an infrared diode laser. The light from the light emitter is preferably matched or optimized with the sensitivity of the light sensors 498, 500, which may comprise for example, photoconductive cells, infrared photo diodes, or infrared photo-voltaic cells.

It is also important to the invention that the light emitted by the light emitter 470 be collimated and then emitted through a slit to generate the diffraction pattern. Therefore, the shape of the slit must be precisely controlled to obtain the diffraction pattern. For example, if a light emitter emits a wavelength of 940 nm, then the slit should be on the order of 0.00005 m to 0.0001 m. The light leaving the slit 476 should travel a distance that is relatively large compared to the slit before contacting the optical bridge. In the above example for instance, a distance of 5 cm is sufficient.

Figure 1:
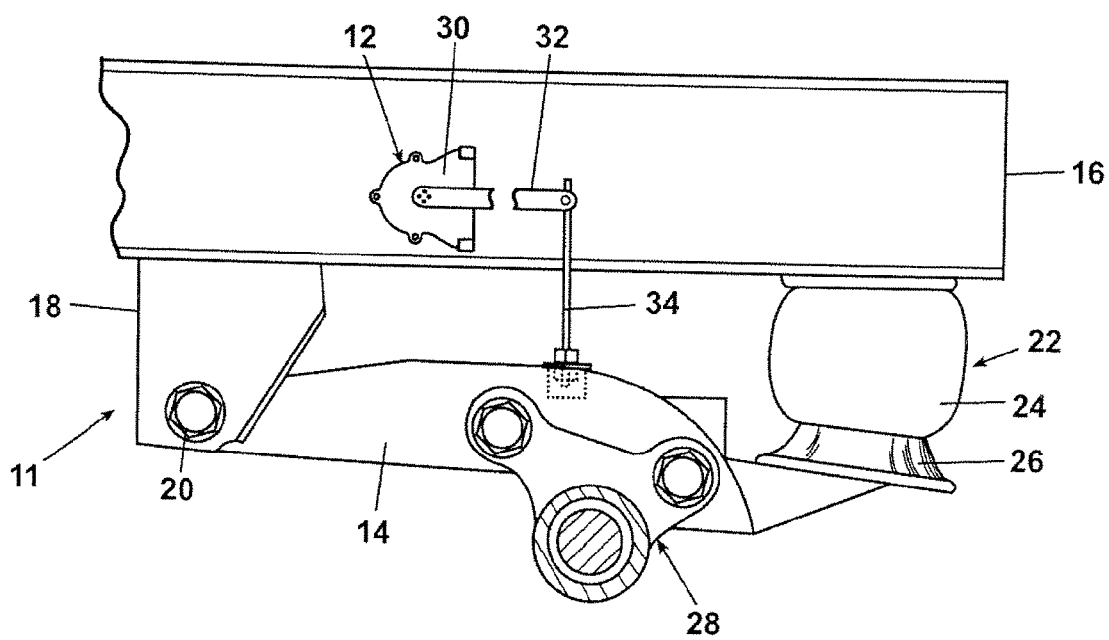
FIG. 1 is an elevational side view of a prior art trailing arm suspension incorporating a known mechanically controlled and actuated height control valve.
Figure 16:
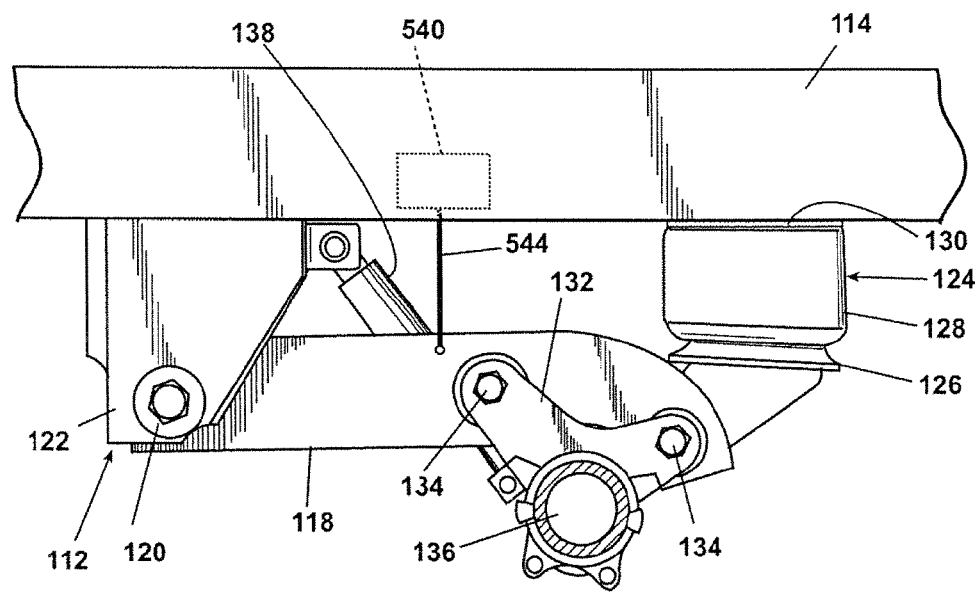
FIG. 16 illustrates a trailing arm suspension incorporating a third embodiment height sensor according to the invention.
Figure 17:
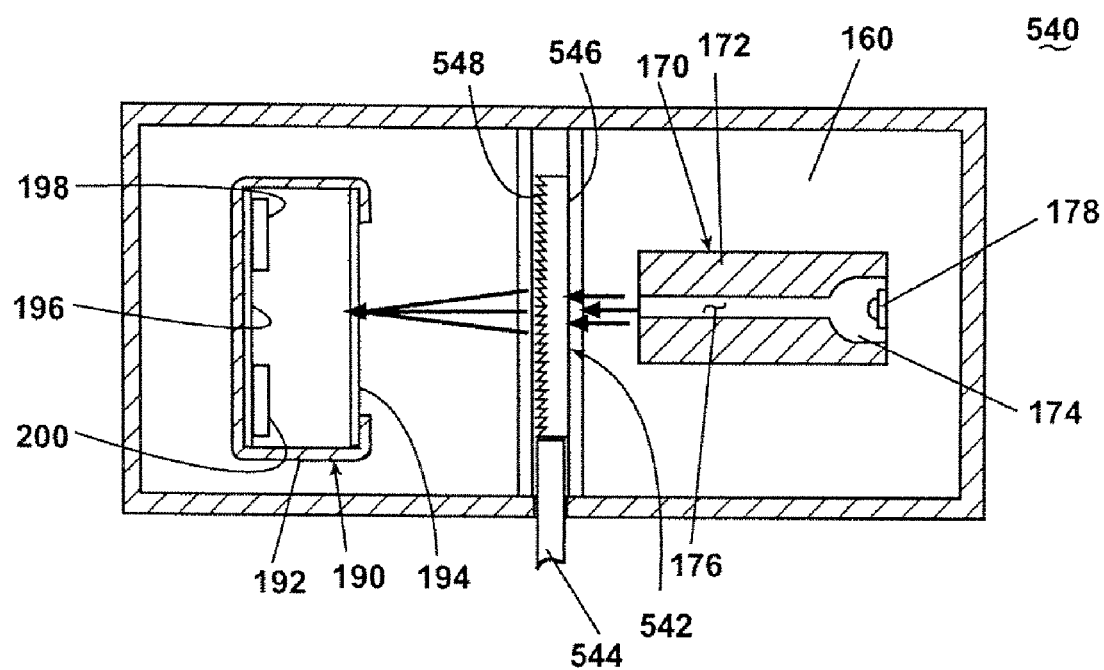
FIG. 17 is a sectional view of the third embodiment height sensor.

FIGS. 16 and 17 illustrate a third embodiment height sensor 540 in the environment of the trailing arm suspension and vehicle shown in FIG. 1. The third embodiment sensor 540 is substantially identical to the first embodiment, except that the height sensor 540 monitors the height change in the trailing arm 118 instead of the rotational change of the trailing arm 118 to assess the change in the height of the vehicle frame from a reference position. Therefore, like parts in the third embodiment as compared to the first and second embodiments will be identified by like numerals. For example, the height sensor 540 can use the same light emitter 570 and light sensor assembly 190 as disclosed in the first embodiment.

The main difference between the height sensor 540 and the height sensor 440 is that the light emitter 570 is fixed and a transversely moving fresnel lens 542 is positioned between the light emitter 570 and the light sensor assembly 190. The fresnel lens 542 is mechanically coupled to the trailing arm 118 by a link 544. As the trailing arm pivots relative to the frame bracket 122, the link 544 reciprocates relative to the height sensor 540 and moves the fresnel lens 542 relative to the fixed position of the light emitter 170 and the light sensor assembly 190.

As is well known, a fresnel lens 542 comprises a series of concentric rings 548, with each ring having a face or reflecting surface that is oriented at a different angle such that light striking the planar surface 546 of the fresnel lens passes through the lens and is focused by the concentric rings to a predetermined focal point.

In the height sensor 540, the planar surface 546 of the fresnel lens 542 faces the light emitter 170 and the concentric rings 548 face the diffuser element 394 of the light sensor assembly 190. Therefore, light emitted from the light emitter 170 and striking the planar surface 546 of the fresnel lens is focused by the concentric rings to a point on the diffuser element 194. The angular orientation of the refracting surfaces generated by the concentric grooves is selected so that the light emitted from the light emitter is focused at the location of the diffuser element 194.

As the trailing arm 118 moves relative to the vehicle, the fresnel lens 542 moves laterally relative to the diffuser element to change the location of the focal point on the diffuser and thereby change the intensity of light as seen by the light sensors 398, 400. The point of light contacting the diffuser element 194 after passing through the fresnel lens 542 is processed in substantially the same manner as described for the first embodiment.

Figure 18:
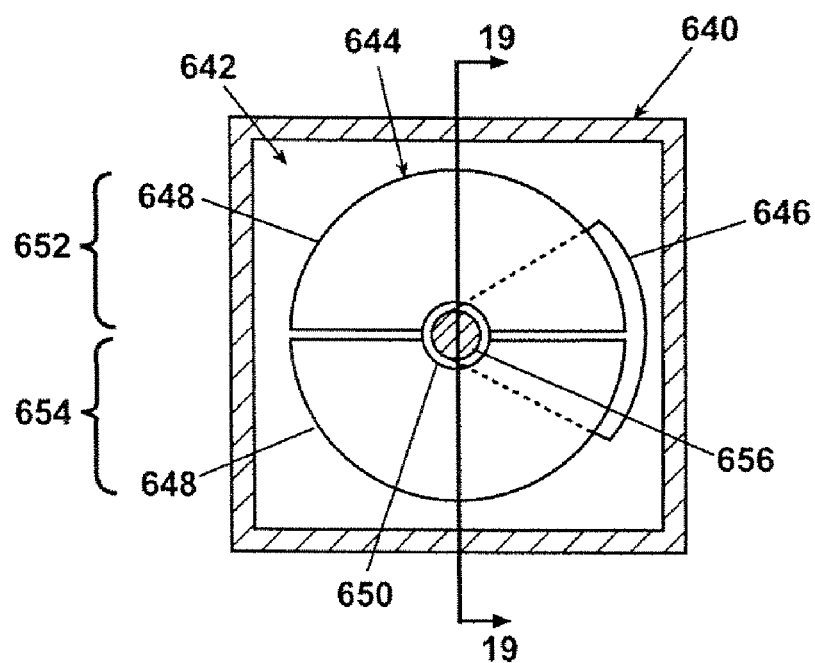
FIG. 18 is a sectional view of a fourth embodiment height sensor according to the invention.
Figure 19:
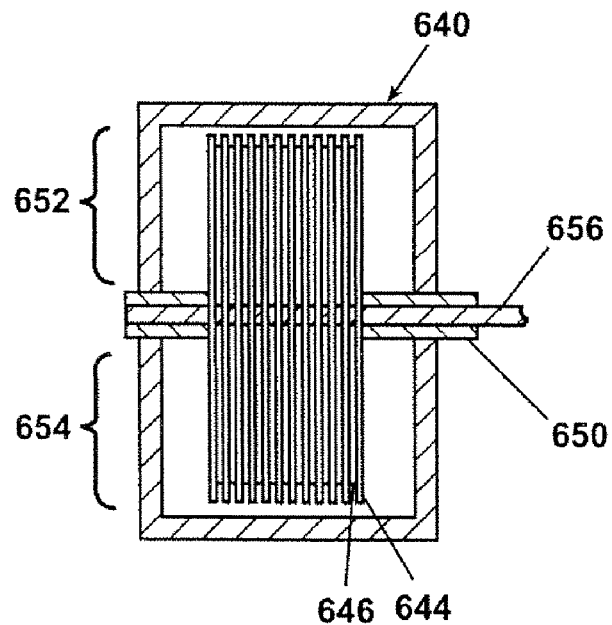
FIG. 19 is a sectional view taken along line 19—19 of FIG. 18 for the third embodiment height sensor.

FIGS. 18 and 19 illustrate a fourth embodiment height sensor 640 according to the invention. The fourth embodiment height sensor 640 is similar to the first and third embodiments in that it responds to the rotational motion of the trailing arm 118 relative to the vehicle frame 114. The height sensor 640 is different in that it relies on a change in capacitance to generate a control signal for determining the change in height of the vehicle frame relative to the trailing arm 118.

The height sensor 640 has a variable capacitor comprising a set of spaced stationary plates 644 between which is disposed a set of moveable plates 646, which forms a capacitor bridge circuit 642. The stationary plates 644 are formed by a pair of opposing semi-circles 648, with each semi-circle being mounted to a support tube 650. The semi-circular plates 648 are mounted the support tube 650 in such manner that they are spaced slightly from each other to effectively divide the stationary plates 644 into a first and second series 652, 654, respectively. The first and second series 652, 654 are electrically distinct. The moveable plates 646 have a sector or pie-wedge shape and are mounted to a rotatable control shaft 656 that is mounted within the support tube 650 and connected to the external shaft 160 so that rotation of the shaft results in the rotation of the moveable plates 646 relative to the stationary plates 644.

In the preferred referenced position, the moveable plates 646 are positioned relative to the first and second series 652, 654 of the stationary plates 644 so that the gap between the first and second series 652, 654 is approximately centered relative to the moveable plate. The space between the stationary plates and moveable plates is preferably filled by a suitable dielectric material.

In operation, as the trailing arm 118 rotates relative to the vehicle frame 114 in response to a change in height of the vehicle, the external shaft 160 rotates the control shaft 656 correspondingly, which moves the moveable plates 646 relative to the first and second series 652, 654 of semi-circular plates. As the moving plates cover more area on one series of semi-circular plates, the capacitance on that series of semi-circular plates increases, resulting in a capacitive differential between the first and second series of plates. The difference in capacitance is related to the magnitude of the height change and is outputted by the height sensor for use in adjusting the height of the vehicle.

Figure 20:
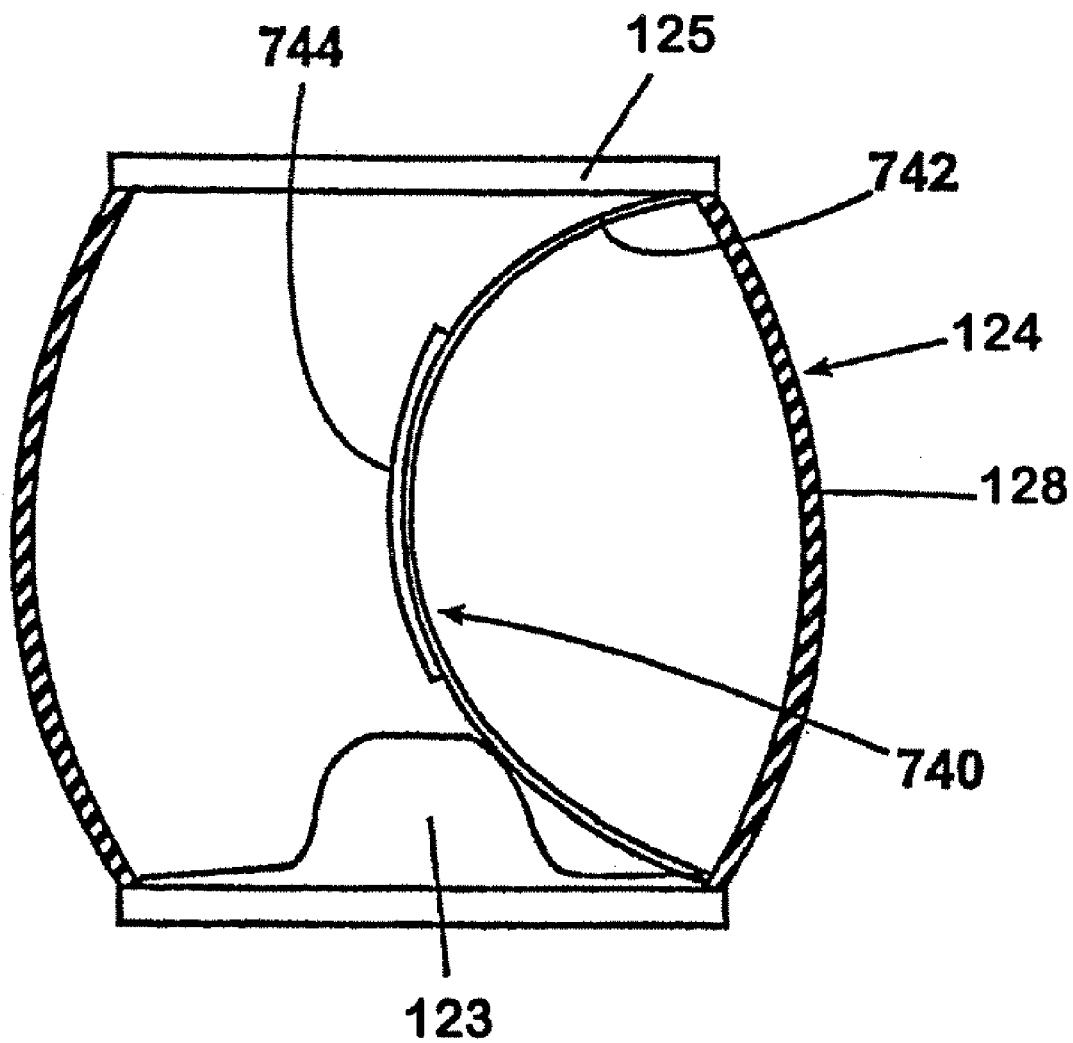
FIG. 20 illustrates a fifth embodiment height sensor according to the invention.

FIG. 20 illustrates a fifth embodiment height sensor 740 according to the invention. Unlike the first through fourth embodiments, the height sensor 740 is not directly connected to the trailing arm 118. Instead, the height sensor 740 is located within the interior of air spring 124. The height sensor 740 comprises a spring plate 742 having one end connected to the top plate 125 of air spring 124 and another portion connected to the piston 123 of air spring 124. A flexible variable resister 744 is fixed to the spring plate 742. The flexible variable resister is well known and described in detail in U.S. Pat. No. 5,086,785, which is incorporated by reference. The flexible resister 744 varies its resistance as it is bent.

The characteristic of the flexible variable resister 744 changing its resistance in response to its bending is used to indicate the amount of height change in the vehicle relative to a reference position. For example, as the height of the vehicle changes in response to the loading or unloading of the vehicle, airbag 128 will correspondingly compress or expand, resulting in a bending of the spring plate 742 and the flexible variable resister 744. The change in the resistance of the flexible variable resister 744 then becomes an indicator of the degree of height change.

For consistency, it is important that the flexible variable resister 744 repeatedly bend in the same manner. The spring plate 742 provides a base for the flexible variable resister 744 and aids in the repeated consistent bending of the flexible variable resister 744.

FIG. 21 illustrates a sixth embodiment height sensor 840 according to the invention. The height sensor 840 is similar to the height sensor 740 in that it uses a flexible variable resister 744 which is wrapped about the coils of a helical or coil spring 842. The coil spring 842 is disposed within the interior of the shock absorber 138.

The shock absorber comprises an exterior cover 844 that is moveably mounted, to and overlies a cylinder 846 from which extends a piston shaft 848, which also extends through the cover 844. The coil spring 842 is wrapped around the piston shaft 848 and has one end attached to the cover 844 and another end attached to an upper portion of the cylinder 846.

The height sensor 840 functions substantially identically to the height sensor 740 in that as the trailing arm 118 rotates relative to the vehicle frame 114, the shock absorber cover 844 reciprocates relative to the housing 846 to compress or expand the coil spring 842, which bends the flexible variable resistor 744. As with the height sensor 740, the bending of the flexible variable resistor 744 and the height sensor 840 results in the height sensor 840 outputting a signal that corresponds to the relative movement of the vehicle frame 114 and trailing arm 118.

FIGS. 22 and 23 illustrate a seventh embodiment height sensor 940 according to the invention and also in the context of a shock absorber 138. The distinction between the seventh embodiment height sensor 940 and the sixth embodiment height sensor 840 is that a spring plate 942 is used in place of the coil spring 842. The spring plate 942 is retained within a separate chamber 645 formed in the cover 844 of the shock absorber.

As with the height sensor 740 the spring plate 942 of the height sensor can have various initially bent shapes. For example, the spring plate as disclosed in the height sensor 740 has a predominately C-shaped profile whereas the spring plate 942 has a half period of a sine wave profile or, in other words, inch-worm-like profile. The profile can just as easily be an S-shape oriented either vertically or horizontally or multiple sinusoidal waves.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A system for controlling the distance between a vehicle axle and a vehicle comprising:
    a sensor that senses a distance between the vehicle axle and the vehicle frame and generates a signal indicative thereof;
    said sensor comprising a transducer selected from the group consisting of: an optical sensor, a hall effect sensor, a magnetic sensor, a variable resistance sensor, ultrasonic sensor and combinations thereof;
    a housing including a wall that at least partially defines a chamber, said chamber including an inlet port, an operating port, and an exhaust port extending therethrough;
    a movable plate with a side which is sealable against the wall by pressurized air supplied to the chamber;
    a motor coupled to the plate via a gearing for selectively moving the plate in a first rotational direction and a second rotational direction opposite to the first rotational direction based on, the signal, between a fill position in which the operating port is connected to the inlet port, and an exhaust position in which the operating port is connected to the exhaust port to selectively control the distance between the vehicle axle and the vehicle frame.

2. The system according to claim 1 further comprising a neutral position in which the operating port is disconnected from both the inlet port and the exhaust port.

3. The system according to claim 1 wherein the movable plate comprises a disk.

4. The system according to claim 3 wherein the disk is rotatable.

5. The system according to claim 4 wherein the operating port and the exhaust port are located on the wall.

6. The system according to claim 5 wherein the rotatable disk that is sealable against the wall overlays the operating port and the exhaust port.

7. The system according to claim 1 further comprising a controller receiving the signal and for controlling said motor.

8. The system according to claim 7 wherein said controller comprises a control logic.

9. The system according to claim 8 wherein the control logic is used in conjunction with the signal to operate the motor.

10. The system according to claim 7 wherein said motor is reversible and said controller operates the motor in a first direction to move the movable plate into the fill position and in a second direction to move the movable plate into the exhaust position.

11. The system according to claim 1 wherein said gear is a worm gear.

12. The system according to claim 1 further comprising a feed-back signal.

13. The system according to claim 12 wherein the feedback signal is indicative of a position of said movable plate.

14. The system according to claim 13 further comprising a controller having a control logic that operates said motor based upon the control logic and the feedback signal that is indicative of the position of said movable plate.

15. The system according to claim 1 wherein the transducer is circuit board mountable.

16. A system for controlling the distance between a vehicle axle and a vehicle comprising:
- a ride height sensor that senses a distance between the vehicle axle and the vehicle frame and generates a ride height signal indicative thereof;
- a position sensor for sensing a position of an anti-creep device and generates a position signal indicative thereof;
- a housing including a wall that at least partially defines a chamber, said chamber including an inlet port, an operating port, and an exhaust port extending therethrough;
- a movable plate with a side which is sealable against the wall by pressurized air supplied to the chamber;
- a controller receiving the position signal and the ride height signal, and controlling movement of the plate according to the signal between a fill position in which the operating port is connected to the inlet port, and an exhaust position in which the operating port is connected to the exhaust port to selectively control the distance between the vehicle axle and the vehicle frame.

17. The system according to claim 16 further comprising a neutral position in which the operating port is disconnected from both the inlet port and the exhaust port.

18. The system according to claim 16 wherein the movable plate comprises a disk.

19. The system according to claim 18 wherein the disk is rotatable.

20. The system according to claim 19 wherein the operating port and the exhaust port are located on the wall.

21. The system according to claim 20 wherein the rotatable disk that is sealable against the wall overlays the operating port and the exhaust port.

22. The system according to claim 16 further comprising a motor coupled to the plate and the controller for moving the plate according to the ride height signal.

23. The system according to claim 22 further comprising a gear coupling said motor to said plate.

24. The system according to claim 23 wherein said gear is a worm gear.

25. The system according to claim 16 wherein said controller further controls said plate based upon the position signal.

26. The system according to claim 16 wherein said controller sends a warning signal to a master vehicle controller when the position sensor senses that the anti-creep device is in a lowered position.

27. The system according to claim 16 wherein said controller comprises a control logic.

28. The system according to claim 27 wherein the control logic is used in conjunction with the sensor signal to control movement of the plate.

29. The system according to claim 16 further comprising a feedback signal.

30. The system according to claim 29 wherein the feedback signal is indicative of a position of said plate.

31. The system according to claim 16 wherein said ride height sensor comprises a transducer.

32. The system according to claim 31 wherein the transducer is circuit board mountable.

33. The system according to claim 32 wherein the transducer is selected from the group consisting of: optical encoder, hall effect sensor, a magnetostrictive, laser, ultrasonic, and combinations thereof.

34. A system for controlling the distance between a vehicle axle and a vehicle comprising:
- a ride height sensor that senses a distance between the vehicle axle and the vehicle frame and generates a ride height signal indicative thereof;
- a position sensor for sensing a position of an anti-creep device and generates a position signal indicative thereof;
- a housing including a wall that at least partially defines a chamber, said chamber including an inlet port, an operating port, and an exhaust port extending therethrough;
- a movable plate with a side which is sealable against the wall by pressurized air supplied to the chamber;
- a motor coupled to the plate via a gearing for selectively moving the plate in a first rotational direction and a second rotational direction opposite to the first rotational direction;
- a controller receiving the position signal and the ride height signal, and controlling movement of the plate in the first and second directions with said motor and gearing according to the ride height signal between a fill position in which the operating port is connected to the inlet port, and an exhaust position in which the operating port is connected to the exhaust port to selectively control the distance between the vehicle axle and the vehicle frame.

35. The air suspension system according to claim 34 further comprising a feedback signal.

36. The air suspension system according to claim 35 wherein the feedback signal is indicative of a position of said plate.

* * * * *